June 3, 1952     E. B. ANDERSON     2,598,749
METHOD OF SEALING UNIVERSAL JOINT ASSEMBLIES
Filed April 20, 1946
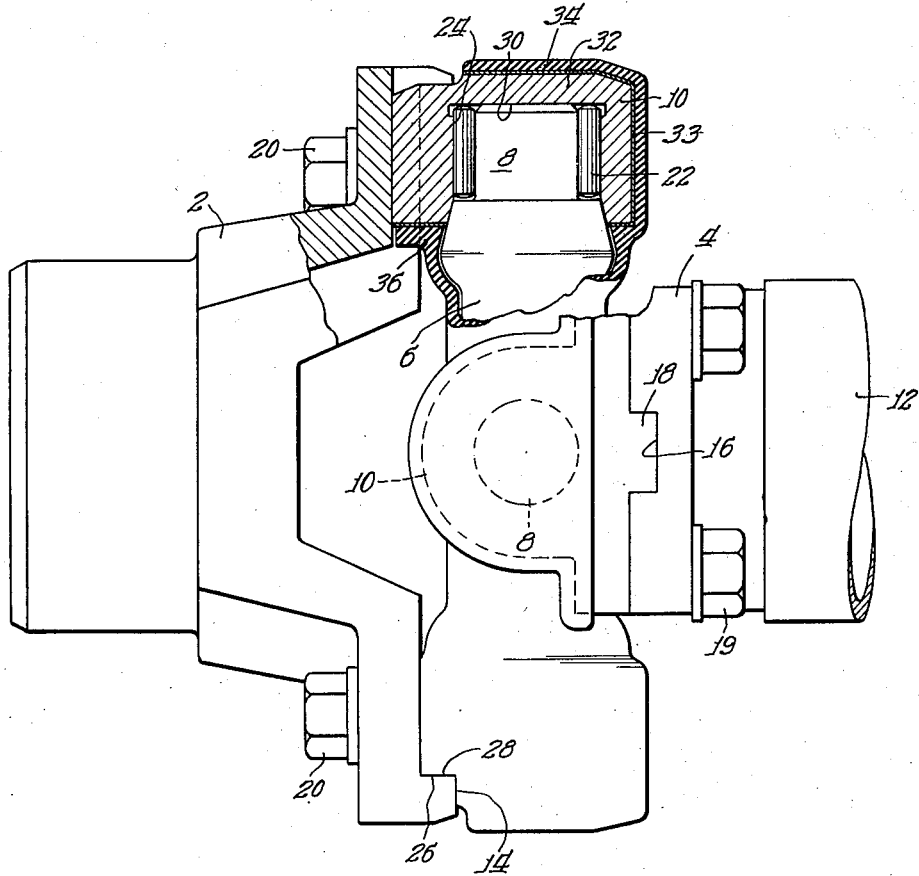
Inventor:
Edmund B. Anderson
By
Atty.

Patented June 3, 1952

2,598,749

UNITED STATES PATENT OFFICE 2,598,749

METHOD OF SEALING UNIVERSAL JOINT ASSEMBLIES

Edmund B. Anderson, Rockford, Ill., assignor to Borg-Warner Corporation, Chicago, Ill., a corporation of Illinois Application April 20, 1946, Serial No. 663,664

7 Claims. (Cl. 117—79)

This invention relates to a flexible hermetically sealed cover for a plurality of members associated in pivotal relationship and to a method of providing a cover having said characteristics for said members.

An object of my invention is the provision of a method for affording a flexible hermetically sealed cover for pivotally-connected members to exclude dirt and dust from access to the connected portions thereof while permitting relative pivotal movement of the members.

A further object of my invention is to provide a method of affording a flexible hermetically sealed cover for pivotally-connected members for the purpose described which can be readily applied to the members in their assembled condition irrespective of the shape of the assembled members.

A further object of my invention is to provide a boot-like cover for pivotally-connected members which hermetically seals the connected portions of the members and possesses sufficient flexibility to provide for the mechanical coaction of the parts enclosed by the cover.

A still further object of my invention is to provide such a cover for pivotally-connected members which closely follow the contour of the connected portions of said members to thereby present a minimum area of said cover to the abrasive section of external dirt thereby greatly prolonging the useful life of the cover.

Other objects of the invention will appear from the following description taken in connection with the drawing, which forms a part of this specification, and in which is shown a side view of a universal joint provided with a cover in accordance with my invention, said joint being shown with one of the bearings in central longitudinal section with the cover being shown in section to more clearly illustrate the invention.

The invention as illustrated in connection with a universal joint constructed somewhat along the lines disclosed in U. S. Patent No. 1,985,531 issued December 25, 1934 to Carl E. Swenson. The universal joint illustrated consists of a pair of yokes or terminal coupling members 2 and 4 pivotally connected by means of an intermediate transmission member 6, often referred to as the spider, the same providing four trunnions 8, 90° apart. The trunnions are received in cup-shaped bearing blocks 10 each yoke being equipped with one pair of these bearings in diametrically opposed relation. The yokes 2 and 4 are suitably connected to driving and driven members or shafts (not shown) in well-known manner, one shaft 12 being shown connected to the yoke 4. The yokes 2 and 4 have machine finished surfaces 14 providing smooth seats for abutment by flat faces provided on the backs of the blocks 10. The yokes are milled to provide the radial slots 16 for reception of radial lugs 18 on the blocks 10 and are bored on opposite sides of the slots 16 to receive bolts 19 and 20 which thread in holes in lugs 18 formed on the bearing blocks 10, whereby to clamp the latter to the yokes.

The bearing blocks 10 may be provided with anti-friction rollers 22 which run on the side of the trunnions 8 on the one hand, and on the other hand, have bearing contact with the side wall 24 of the cylindrical bearing recess provided in the blocks.

Shoulders 26 are provided on the yokes for engagement with surfaces 28 on the bearing blocks to assume the load incident to end thrust, the trunnions 8 being disposed with the ends thereof arranged to bear against end thrust surfaces 30 provided on the inside of the end walls 32 of the bearing blocks 10. The bolts 20 are, therefore, relieved of load due to end thrust and torque, and serve primarily to clamp the bearing blocks to the yokes.

It will be apparent from the foregoing description, that the universal joint will permit the two shafts respectively connected to the yokes 2 and 4 to pivot with respect to each other so as to permit angular motion in all directions and in such manner that one part may convey rotary motion to the other.

According to the present invention, I have provided a flexible cover 34 completely enclosing and hermetically sealing the universal joint to exclude dirt from the bearing portions thereof while providing for the mechanical coaction of these portions encased by the cover.

The cover 34 is of boot-like shape and is formed of rubber or rubber-like material. This material may be natural rubber or synthetic rubber having the characteristics of flexibility and elasticity. Any one of several types of any suitable commercially available synthetic rubber, such as neoprene or Perbunam, may be used. Perbunam is a synthetic rubber composed of a copolymer of butadiene and acrylonitrile. Neoprene is a polymer of monochlorbutadiene. In the embodiment of the invention shown, the material of the cover is bonded to the surfaces of the bearing blocks 10 and, for the purpose of allowing pivotal movement of yokes, and thereby the shafts connected thereto, relative to the spider 6, the material of the cover is in unbonded relation to the spider and thereby loosely encases the spider while hermetically sealing the same as well as the trunnions thereof and the bearing blocks 10 to protect against external dirt and dust.

In the embodiment selected to illustrate my invention, the universal joint may be formed of steel and, therefore, it has thus far been found necessary, in utilizing one of the above mentioned rubber materials to provide a cover for the purposes described, to follow the procedure in practicing the method of my invention mentioned hereafter given.

My novel method contemplates that the joint, in its assembled condition, has the surfaces of the bearing blocks 10 thereof plated with a brass coating 33, as shown, or painted with a suitable commercially available bonding solution such as Ti-Ply cement or Plio-Bond, to provide bonding characteristics to the metal composing these parts of the joint. Ti-Ply cement has a composition which is a trade secret, and its composition has never been chemically analyzed. It is known that Ti-Ply cement will give a satisfactory bond with rubber upon the application of a known pressure and heat. Plio-Bond is cyclized isomerized rubber or a rubber hydrochloride cement which is well known in the art as having an extensive use as a cement for bonding both natural rubber and synthetic rubber to metal, this cement being merely applied to a metallic surface, and thereafter the natural rubber or synthetic rubber in liquid form is applied to the coated surface, the natural or synthetic rubber coating is then allowed to dry either naturally or by heat in the absence of pressure application. The parts of the joint not desired to be bonded to the material of the cover, is the spider 6 which is not treated, or which, if desired, may be painted with an antibonding solution, such as a sodium silicate solution, or a clear lacquer. Thereafter, the joint is dipped in the fluid rubber, or the rubber is otherwise applied to the surfaces of the assembly to be treated, and, in the case of the bearing blocks' surfaces being brass-plated, the rubber is then cured i. e. vulcanized, by heating at a suitable temperature to effect the cure of the rubber to bond the same to the treated surfaces of the bearing blocks 10. In the case of Pilo-Bond being applied to the bearing blocks' surfaces, the joint need only be dipped into the fluid rubber, which is allowed to dry by exposure to the air or by heat application to effect a bond of the rubber and treated surfaces. Should Ti-Ply cement be used for surface treatment, pressure and heat are required to bond the rubber to the Ti-Ply cemented surfaces of the bearing blocks. It may be noted that in dipping the assembly in the fluid rubber or in the application of the fluid rubber to the assembly by other means, the entire assembly will be covered. It may also be noted that, after dipping the joint in the fluid rubber, or in otherwise applying the rubber to the joint, the bearing blocks 10 will have their treated surfaces covered and the spider will be entirely covered with a film of the rubber which will be bonded to the aforesaid treated surfaces and will fail to bond to the untreated spider. As a result, the rubber material will form the cover 34 which will entirely enclose and loosely fit the spider and, due to the connection of the cover 34 to the bearing blocks, will exclude external air from the assembly by forming a hermetically sealed bond between the treated surfaces of the bearing block and the rubber material. As previously pointed out, the yoke and spider are capable of relative movement due to the roller bearings 22 between the spider trunnions and the bearing blocks and it will be equally apparent that the cover is loosely fitted on the spider to flex upon relative movement of the spider and either or both of the yokes to permit such relative movement without breaking the hermetic seal by rupturing the portion of the cover bonded to the bearing blocks at their juncture 36 with the portion of the cover loosely fitting the spider. The cover thus is instrumental in sealing the pivotally connected parts of the joint while allowing free relative movement between the parts. This feature is clearly shown to be the fact as the rubber-like boot cover is bonded to the treated areas of the parts and a bond is avoided in other untreated areas of the parts which otherwise would destroy the cover were there a fixed relationship or bond between the latter parts and the relatively movable parts.

From the foregoing, it will be seen that I have provided a flexible boot-like hermetically sealed cover for a plurality of members associated in pivotal relationship and also a method of providing a cover for said members whereby dirt is excluded and the mechanical coaction of the parts covered by the boot is freely permitted. Furthermore, the cover can be readily applied to the parts in their assembled condition and irrespective of the shape of the parts, thereby dispensing with the customary practice of making a cover to suit the particular dimensions of a joint and thereafter assembling the same with the joint whereby a substantial saving is effected in the cost of manufacture of a hermetically sealed joint by the method of the present invention.

It will be readily apparent that in the event the universal joint has the bearing blocks 10 thereof formed of brass, the surfaces of the blocks need not be treated with a bonding solution to bond the rubber thereto and this step of the process may be eliminated inasmuch as the rubber will bond directly to brass. It can therefore be seen that my novel method in its application is dependent upon the bonding or anti-bonding characteristics of the metal or metals, or other material, forming the joint, as well as the characteristics of the natural or synthetic rubber, or other air-impervious resilient material, to bond or not to bond to the material of the joint, and the steps of the method will, therefore, necessarily change, or certain steps may be eliminated, in practicing my invention. The invention, therefore in its broadest aspect, contemplates the method of bonding the resilient cover to certain areas of members associated in pivotal relationship while loosely enclosing the members at their point of pivotal connection to thereby provide a flexible hermetically sealed cover for said connection while permitting free mechanical coaction of the members.

It may be noted that in the application of the fluid rubber to the joint by dipping the latter to cover the joint, substantially the entire assembly will be covered with the rubber. Upon subsequent curing treatment, the rubber will only be bonded to the treated surfaces and the other portions of the assembly, for example, the yokes 2 and 4, will have the rubber loosely fitted thereon, if desired, the rubber may be removed from these portions by cutting the rubber with a suitable instrument at the juncture of the cover bonded to the treated surfaces whereby the rubber can be freed from the joint to facilitate the adjustment of the bearing blocks and the yokes relative to each other as pointed out in the above mentioned patent. However, if the rubber is applied directly only to the treated surfaces of the bearing blocks and to the untreated spider and subsequently cured, no superfluous rubber will cover the yokes and this cutting operation may be dispensed with.

My invention contemplates that the flexible type hermetically sealed cover may be composed of either natural rubber or synthetic rubber that has the characteristics of natural rubber in the form of flexibility and ability to return to its original shape after stretching or deformation thereof. Accordingly where the term "rubber" is used in the claims it is to be construed as contemplating natural rubber or synthetic rubber having the above-identified characteristics of natural rubber.

While I have shown my invention as applied to a universal joint, it will be apparent that it is equally applicable to provide a hermetically sealed cover for other types of pivotally connected assemblies, for example, ball and socket universal joints, and steering joints of automobiles, and, therefore, the embodiment of the invention shown and described is merely for purposes of illustration of the invention and is not to be limited thereto in its application.

I claim:

1. The method of providing a flexible hermetically sealed cover of rubber for a universal joint assembly, the assembly being completely covered by rubber and consisting of a plurality of members pivotally connected together by a spider pivot element, said members and element being of metal not bondable to rubber, said method comprising the steps of applying a rubber-derivative cement to said members, said cement adhering to said members and being bondable to rubber; covering said members and element entirely with liquid rubber; and drying said coated members and element to solidify the rubber into a continuous film, the portions of said film covering said members forming a hermetically sealed bond therebetween while the remainder of the rubber film loosely surrounds and encloses said element whereby it is in unbonded relation to said element thus providing a flexible loose cover for said element thereby allowing free pivotal movement of the members while sealing the assembly from communication with the external air.

2. The method of providing a flexible hermetically sealed cover of rubber for a universal joint assembly, the assembly being completely covered by rubber and consisting of a plurality of members pivotally connected together by a spider pivot element, said members being of a metal bondable to rubber and said element being of a metal incapable of being bonded to rubber, said method comprising the step of covering said members and element entirely with liquid rubber; and drying the rubber, coating the assembly, to solidify the rubber into a continuous film, the portions of said film covering said members forming a hermetically-sealed bond therebetween while the remainder of the rubber film loosely surrounds the element whereby it is in unbonded relation to the element thus providing a flexible loose cover for said element thereby allowing free pivotal movement of said members while sealing the assembly from communication with the external air.

3. The method of providing a flexible hermetically sealed cover of natural rubber for a universal joint assembly, the assembly being completely covered by rubber and consisting of a plurality of members pivotally connected together by a steel spider pivot element, said members having brass surfaces, said method comprising the steps of covering said members and elements entirely with liquid natural rubber; and heating the coated members and element to dry the rubber to silidify the rubber into a continuous film, the portions of said film covering said members forming a hermetically sealed bond therebetween while the remainder of the rubber film loosely surrounds and encloses said element whereby it is in unbonded relation to said element thus providing a flexible loose cover for said element thereby allowing free pivotal movement of the members while sealing the assembly from communication with the external air.

4. The method of providing a flexible hermetically sealed cover of rubber for a universal joint assembly, the assembly being completely covered by rubber and consisting of a plurality of members pivotally connected together by a spider pivot element, said members and element being formed of metal readily bondable to rubber, said method comprising the steps of applying an antibonding liquid coating to said element for preventing the adherence of rubber thereto; covering the members and element entirely with liquid rubber; and drying the liquid rubber coating to solidify the rubber into a continuous film, the portions of said film covering said members forming a hermetically sealed bond therebetween while the remainder of the rubber film loosely surrounds said element whereby it is in unbonded relation to said element thus providing a flexible loose cover for said element thereby allowing free pivotal movement of the members while sealing the assembly from communication with the external air.

5. The method of providing a flexible hermetically sealed cover of rubber for a universal joint assembly, the assembly comprising a pair of opposed yoke members, an intermediate spider member having trunnions, and bearing block members fitting on the trunnions and fastened to the yoke members, said spider member and said bearing block members being completely covered by rubber, said universal joint members being formed of a metal incapable of being bonded to rubber, said method comprising the steps of applying a rubber-derivative cement to the external surfaces of said bearing block members, said cement adhering to said surfaces and being bondable to rubber; covering the bearing block members and said spider member entirely with liquid rubber and drying the rubber, coating said bearing block members and said spider member, to solidify the rubber into a continuous film, the portions of said film covering said external surfaces of said bearing block members forming a hermetically sealed bond therebetween while the remaining portions of said rubber film loosely surrounds said spider member whereby it is in unbonded relation to said spider member thus providing a flexible loose cover for the spider member thereby allowing free pivotal movement of the yoke members while completely sealing the bearing block members and spider member from communication with the external air.

6. The method of providing a flexible hermetically sealed cover of rubber for a universal joint assembly, the assembly comprising a pair of opposed yoke members, an intermediate spider member having trunnions and bearing block members fitting on the trunnions and fastened to the yoke members, said spider member being formed of a metal not bondable to rubber, said bearing block members being formed of a metal readily bondable to rubber, said spider member and said bearing block members being completely covered by rubber, said method comprising the step of covering the bearing block members and the spider member with liquid rubber; and drying said rubber coating on said members to solidify said rubber into a continuous film, the portions of said film covering said bearing block members forming a hermetically sealed bond therebetween while the remainder of the rubber film loosely surrounds said spider member whereby it is in unbonded relation to said spider member thus providing a flexible loose cover for the spider member thereby allowing free pivotal movement of the yoke members while completely sealing the bearing block members and spider member from communication with the external air.

7. The method of providing a flexible hermetically sealed cover of rubber for a universal joint assembly, the assembly comprising a pair of opposed yoke members, an intermediate spider member having trunnions, and bearing block members fitting on the trunnions and fastened to the yoke members, said spider member and said bearing block members being completely covered by rubber, said universal joint members being formed of metal readily bondable to rubber, which method comprises the steps of applying an antibonding liquid coating to the external surfaces of the spider member, said coating being formed of a liquid material adhering to said surfaces and being incapable of being bonded to rubber; covering said bearing block members and spider member entirely with liquid rubber; and drying the rubber to solidify the rubber into a continuous film, the portions of said film covering said bearing block members forming a hermetically sealed bond therebetween while the remainder of the rubber film loosely surrounds said spider member whereby it is in unbonded relation to said spider member thus providing a flexible loose cover for the spider member thereby allowing free pivotal movement of the yoke members while completely sealing the bearing block members and spider member from communication with the external air.

EDMUND B. ANDERSON.

REFERENCES CITED

The following references are of record in the file of this patent:

UNITED STATES PATENTS

| Number | Name | Date |
|---|---|---|
| 2,052,582 | Robinson | Sept. 1, 1936 |
| 2,058,165 | McCoy | Oct. 20, 1936 |
| 2,209,854 | Slaght | July 30, 1940 |
| 2,240,862 | Schade | May 6, 1941 |
| 2,338,169 | Dunn | Jan. 4, 1944 |
| 2,350,559 | Kienitz | June 6, 1944 |
| 2,459,744 | Rafter | Jan. 18, 1949 |